United States Patent [19]

Lining et al.

[11] 4,162,910
[45] Jul. 31, 1979

[54] VALVE BLOCK ASSEMBLY

[75] Inventors: Kurt Lining; Charles L. Wood, both of Muncie, Ind.

[73] Assignee: Ball Corporation, Muncie, Ind.

[21] Appl. No.: 653,059

[22] Filed: Jan. 28, 1976

Related U.S. Application Data

[63] Continuation of Ser. No. 516,223, Oct. 21, 1974, abandoned, which is a continuation of Ser. No. 208,199, Dec. 15, 1971, abandoned.

[51] Int. Cl.² .............................................. C03B 9/40
[52] U.S. Cl. ....................................... 65/163; 65/161; 65/164
[58] Field of Search .................. 65/160, 161, 163, 164, 65/232, 243

[56] References Cited

U.S. PATENT DOCUMENTS

1,878,521  9/1932  Ingle ........................................ 65/76
3,615,330 10/1971  Jones ...................................... 65/161
3,762,907 10/1973  Quinn et al. ............................ 65/163

Primary Examiner—Arthur D. Kellogg
Attorney, Agent, or Firm—James D. Haynes

[57] ABSTRACT

A multi-step glass forming machine having a plurality of mechanically actuated valves adapted to initiate the various steps in the operation of the machine is disclosed herein and includes an electronically controlled valve block assembly for mechanically actuating the aforestated valves. The valve block assembly includes a plurality of piston and cylinder arrangements, the pistons of which are pneumatically movable from a retracted position to an extended position for actuating respective ones of the valves. In this regard, the pistons are moved to their respective extended positions in response to the energization of an associated electrically actuated control valve and by a common pressurized air supply which is preferably independent of the glass forming machine.

5 Claims, 7 Drawing Figures

VALVE BLOCK ASSEMBLY

This is a continuation of application Ser. No. 516,223, filed Oct. 21, 1974, which was a continuation of application Ser. No. 208,199, filed Dec. 15, 1971 both now abandoned.

BACKGROUND OF THE INVENTION

1. Field of the Invention

The present invention relates generally to a glass forming machine and more particularly to a valve block assembly for sequencing the operational steps of the machine.

2. Description of the Prior Art

Today, glassware is generally produced by utilizing highly complex and automated machines such as, for example, one normally referred to as an individual section glass forming, or IS machine, which is required to carry out a plurality of operational steps in its manufacture of glassware. One commonly used method of sequencing these operational steps has been to use a large rotatably mounted drum carrying a plurality of buttons or cams appropriately positioned on the surface of the drum. In this manner, as the durm is revolved about its axis, the cams sequentially contact and actuate a number of pneumatic valves which when actuated respectively initiate into operation the aforestated operational steps.

While the aforedescribed mechanical method of controlling the operational sequence of a glass forming machine carries with it certain advantages such as, for example, reliable actuation of the machines pneumatic valves, it, on the other hand, displays many disadvantages such as, for example, the cumbersome task of individually adjusting each cam in order to retime the machine. Accordingly, a second method of controlling the operational sequence of the glass forming machine, and one which is responsive to the disadvantages displayed by the mechanical method, is by electronic initiation. One example of an electronic initiating method is disclosed in U.S. Pat. No. 3,365,623 issued to David S. Stacey on Jan. 23, 1968, and entitled "Automatic Control System." In this patent, a control system which generates sequenced electrical pulses is disclosed. The pulses generated are individually fed to pulse responsive means which are part of and arranged to operate a processing apparatus such as a glass forming machine. In this manner, the aforedescribed drum actuated valves and drum can be eliminated and replaced with the pulse actuated valve means.

A more recent method of electronically controlling the operational sequence of a glass forming machine is disclosed in U.S. Pat. No. 3,762,907 to Richard M. Quinn et. al. entitled "A Glass Forming Machine Having An Automatic Control System," and assigned to the assignee of the present invention. This application also discloses the utilization of electronically actuated valve means in place of the aforedescribed drum.

While the aforedescribed electronically controlled systems display many advantages over the prior art such as, for example, the accurate manner in which they control the sequence of a glass forming machine or the ease in which they allow retiming of the sequence, they do provide room for improvement. For example, electrically or pulse actuated valve means have been found on occasion to stick due to the rather hostile environment in which a typical glass forming machine is used. If this happens, it is readily apparent that the overall sequential operation of the machine would be interrupted which, in turn, could cause delay in the production of glassware. In addition these types of electronically controlled systems often utilize a common air supply for pneumatic operation and common lubrication supplies which only add to the sticking valve problem.

SUMMARY OF THE INVENTION

The present invention overcomes many of the foregoing deficiencies thereof by providing a heretofore unavailable improvement in a glass forming machine and more particularly in a system for controlling the operational sequence of such a machine.

Accordingly, an object of the present invention is to provide a new and improved glass forming machine over those of the prior art.

Another object of the present invention is to provide a new and improved assembly for controlling the operational sequence of a glass forming machine.

Yet another object of the present invention is to provide a glass forming machine having a new and improved operational sequence control assembly which is more reliable and, at the same time, more accurate than heretofore provided.

Still another object of the present invention is to provide a glass forming machine having a new and improved electrically controlled operational sequence assembly which minimizes valve malfunction otherwise caused by the hostile environment of the glass forming machine.

Yet a further object of the present invention is to provide a glass forming machine having a new and improved pneumatic valve block assembly which is provided for controlling the operational sequence of the glass forming machine and which utilizes a separate air supply from that used with the rest of the machine.

Still a further object of the present invention is to provide a glass forming machine having a new and improved pneumatic valve block assembly which can more economically utilize a purer air supply than the rest of the glass forming machine and which can more economically utilize a higher grade lubricating oil than the rest of the glass forming machine.

Yet a further object of the present invention is to provide a new and improved glass forming machine including a piston means adapted for movement from a retracted position to an extended position in response to an electrical signal. The piston means is positioned adjacent an associated mechanically actuated valve means for actuating the latter when the piston means is in its extended position. Upon actuation, the mechanical valve initiates into operation a particular step in the glass forming operation.

These and other objects and features of the present invention will become apparent from the following descriptions.

DETAILED DESCRIPTION

Figure 1:
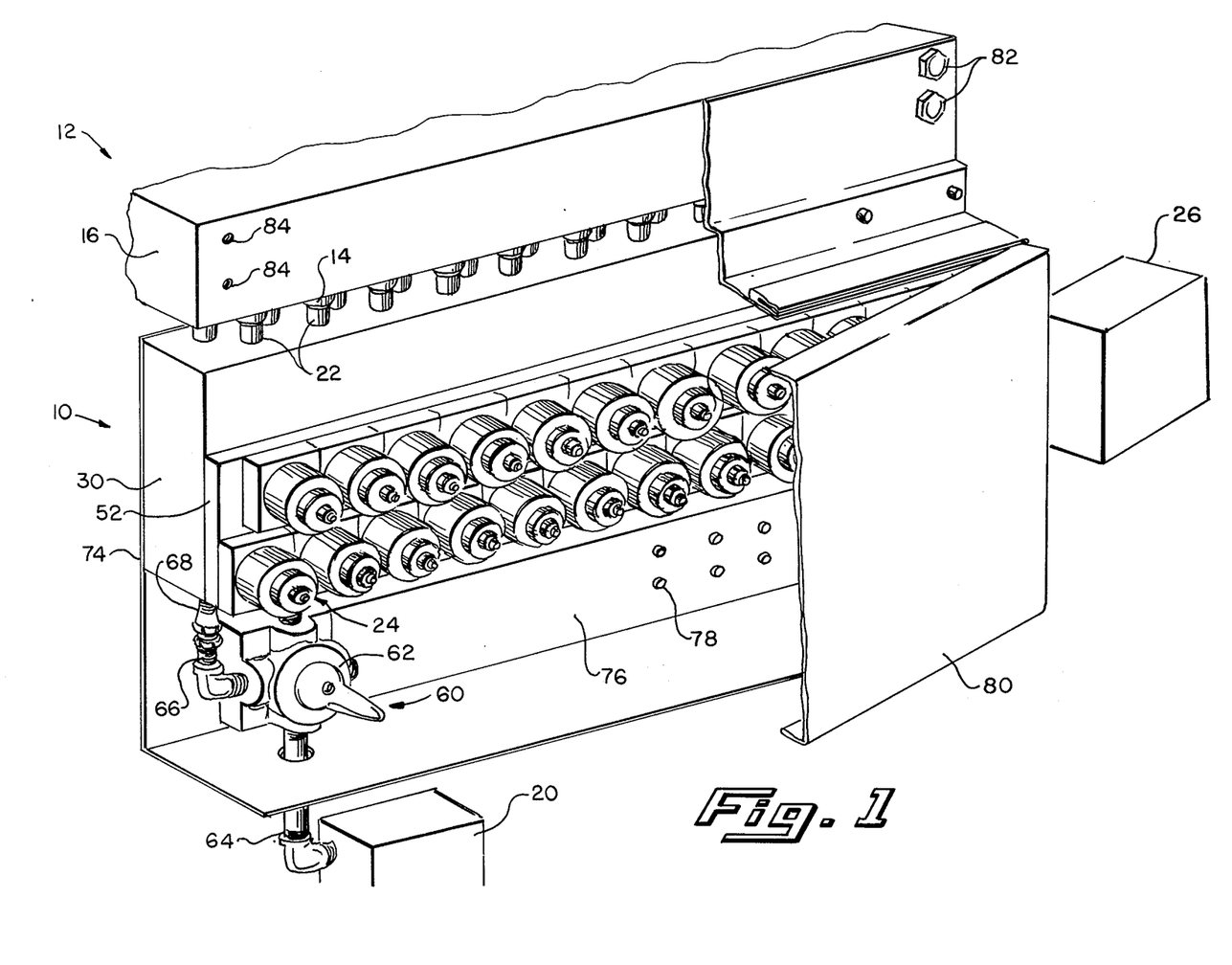
FIG. 1 is a partially broken-away perspective view of a valve block assembly which is constructed in accordance with the present invention and which is shown in combination with a glass forming machine.

Turning now to the drawings, wherein like components are designated by like reference numerals throughout the various figures, a valve block assembly 10, constructed in accordance with the present invention, is shown in FIG. 1 mounted to a glass forming machine 12, only a portion of the glass forming machine being shown. The glass forming machine may be a conventionally known apparatus such as, for example, one normally referred to as an individual section, or IS, machine, which carries out a plurality of sequential operational steps in forming glassware and which utilizes a plurality of mechanically actuated valves 14 for initiation of these steps.

Glass forming machines, generally, and individual section machines, in particular, are well known to those skilled in the art, and no detailed description of the structure or operation thereof is necessary in a disclosure of the present invention. However, irrespective of the particular type of glass forming machine contemplated, certain basic elements are present, and a brief description of such elements, their operation and their relationship to a few of the elements peculiar to the blow-and-blow machine is in order to gain a clearer perspective of the invention.

Figure 6:
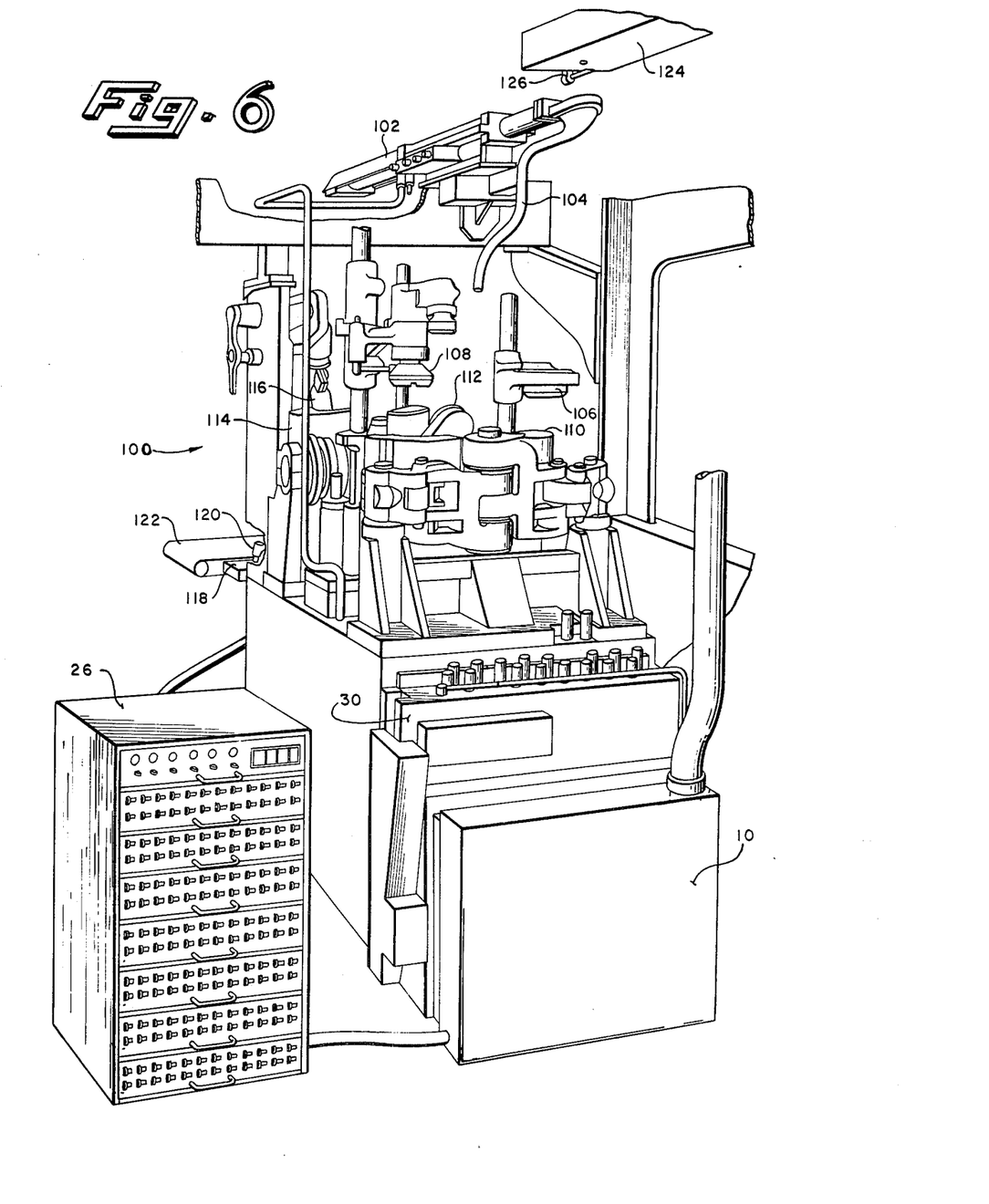
FIG. 6 is a perspective view of one of the sections of a glass forming machine.

As illustrated in FIG. 6, one of the sections 100 of a blow-and-blow machine is shown from the back side or blank mold side, displaying such elements as scoop 102, delivery means 104 and both funnel 106 and baffle 108 associated with blank mold 110. A transfer or invert mechanism 112 is positioned intermediate the front and back sides of the machine, for inverting the parison formed in the blank mold 110 while transferring it to a blow mold 114 at the front of the section. A suitable takeout mechanism 116 is positioned near blow mold 114 for removal of the hot finished ware therefrom and transferred to a corresponding dead plate 118. Also, on the front side of the machine is pushout mechanism or pusher arm 120 for delivering the ware from the dead plate 118 to conveyor means 122, which, as stated above, will normally serve to transport the ware for further processing, as, for example, to a suitable lehr (not shown) for annealing and subsequent cooling and any other desired treatment (such as a lubricant coating).

It will be understood, as stated above, that the machine thus illustrated in FIG. 6 is but one section of a plural-section machine. In the embodiment of the invention to be described herein, the overall machine will comprise six sections or more, each being fed a gob of molten glass in ordered sequence from single-feeding means 124 which constitutes a portion of a suitable source of molten glass, such source usually including means for weighing and mixing the several dry ingredients and means for delivering batches of such mix to a furnace, in which the mix is converted to a molten mass and maintained at a desired temperature for delivery to a feeding means, such as feeding means 124. The continuous flow of molten glass from feeding means 124 is interrupted by a shear means 126, which cuts the molten glass into individual gobs for delivery to the several sections of the machine in sequence, as will be further described herein.

It is customary to employ pneumatic pressure as the motive force for actuating each of the plurality of moving elements of the individual section machine, and the control system of the present invention, being well suited to pneumatic actuation, will be described as a means for actuating a plurality of pneumatic valves in a desired sequence for applying pneumatic pressure selectively to a corresponding plurality of pneumatic actuators (such as piston-cylinder assemblies) which serve as the respective motive means for the several moving elements of the machine.

Figure 7:
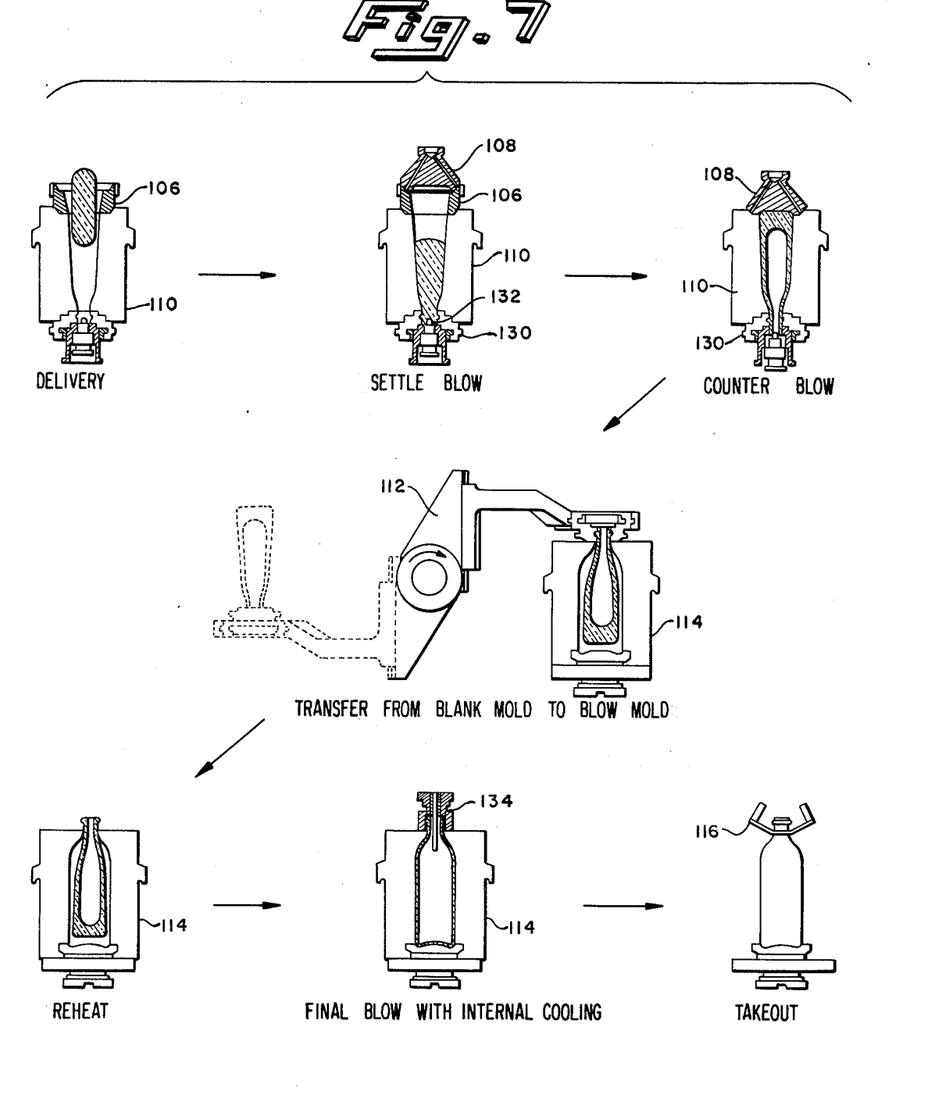
FIG. 7 is an illustration of the operational sequence of the glass forming machine of FIG. 6.

Such machine elements have been shown, at least generally, in FIG. 6; however the interrelated operation thereof will be more fully appreciated and understood in connection with a combined description of FIGS. 6 and 7, the latter showing schematically the sequence of events in one section of a blow-and-blow machine.

First, the continuous flow of molten glass from the feeder 124 is repetitively severed at a predetermined rate by means of shears 126, separating the flow into a series of gobs. As each section of the machine acquires a gob in sequence, the gob falls from the shears 126 and is carried by the delivery means 104 (including a scoop, trough and deflector) to the blank mold 110, over which the funnel 106 is positioned in order to guide the gob into the mold. Thus, as is indicated in the first step in the sequence illustrated in FIG. 7, the gob falls through funnel 106 into the interior of the mold. As a second step, the baffle 108 is positioned over the funnel 106, and air discharged into the mold through baffle 108 forces the molten glass into the neckring 130 and around the plunger 132, in a step referred to as settle-blow. The third step set forth in FIG. 7 shows the funnel 106 removed and baffle 108 in place on top of the blank mold, with plunger 132 retracted. Counterblow air now is introduced into the depression left in the glass by the plunger, causing the glass to fill the blank, forming a parison.

During this counterblow step, the third step in FIG. 7, the body of the blank mold extracts heat from the parison sufficiently to form a cooled skin thereon which is sufficiently rigid to permit manipulation of the parison by a transfer mechanism which carries the parison to the blow mold 114 on the front side of the machine. This transfer of the parison from blank to blow molds is illustrated as the fourth step in FIG. 7, wherein the pivotal transfer mechanism 112 removes the parison from between the opened halves of the split blank mold and places it between the closing halves of the blow mold, having inverted the parison in the process, so that it is now in an upright position, with the mouth at the top, and supported by the neckring 130.

Subsequent to the invert step, the neckring halves are separated, so that the parison is left hanging by the now-closed halves of the blow mold. In this position, the reheat step takes place, in which the cooler skin of the glass is reheated by the relatively hot interior glass, and the parison then becomes sufficiently soft for final blowing.

In the final blowing, indicated in step 6 of FIG. 7, blowhead 134 is positioned over the blow mold 114, and blow air is forced into the soft parison, causing it to fill the blow mold and take the shape thereof, the shape of the desired finished ware. Here, again, heat is absorbed by the mold walls, cooling the glass to render it sufficiently stiff for handling.

In the last step shown in FIG. 7, the split halves of the blow mold have parted, and the tongs of the takeout mechanism 116 grip the ware at the neck and transfer it to the dead plate, for further cooling and pushout to the conveyor.

As is obvious, the timing of the movements of all of the foregoing glass forming elements is critical, and each element must be moved with precision not only to enable it to perform its function in the overall process, but to prevent collisions between elements, whereby one faulty element would prevent other elements from performing their tasks. For example, if the scoop for a given section fails to retract in time from a position under the shears, the scoops of other sections will be jammed in attempting to acquire gobs. If the blank mold fails to open properly, the next gob will fall on top of the blank. If the funnel is not positioned over the blank at the proper time, the gob might fail to enter the blank. Should the baffle fail to come down as needed the parison would be misformed. If either the funnel or the baffle failed to leave the top of the blank after parison formation, the transfer arm would then collide with the faulty element on attempting invert. If the plunger fails to rise or retract as required, faulty parison formation follows. Should the transfer arm fail to revert, remaining in a position over the blow mold, the blowhead would be prevented from being seated atop the blow mold as required for final forming. Were the blowhead not to retract after final forming, a collision would occur with the takeout mechanism, as well as with the transfer arm on the next invert. Malformation of the ware results from failure of the blow mold to close and open properly, as well as from a failure of final blow. Should the takeout mechanism fail to retrieve a finished ware, the next subsequent parison will be jammed down on top of the previously finished piece. Where the neckring fails to open after invert, the parison will remain in the neckring and on revert will be placed back in the blow mold.

The foregoing tabulation of operating failures, tedious as it is, is only a partial listing of the faults that may occur in each section of an individual section machine, and a recital of even this partial list of faults serves to emphasize the necessity for accurate and reliable control of the operation of the machine. Accuracy of control is essential to the synchronous operation of the many elements within each section of the machine, as well as with respect to the timing of gob acquisition and finished ware delivery in the related control of the several sections. Reliability is equally essential in order to keep such elements moving in order to prevent extended shutdowns.

Figure 2:
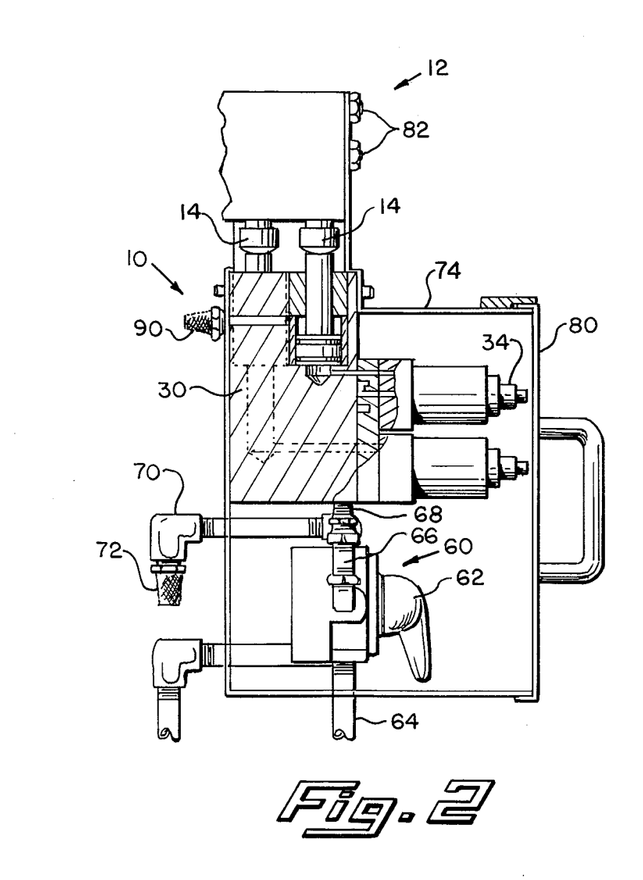
FIG. 2 is a partially broken-away side view of the valve block assembly and glass forming machine illustrated in FIG. 1.
Figure 4:
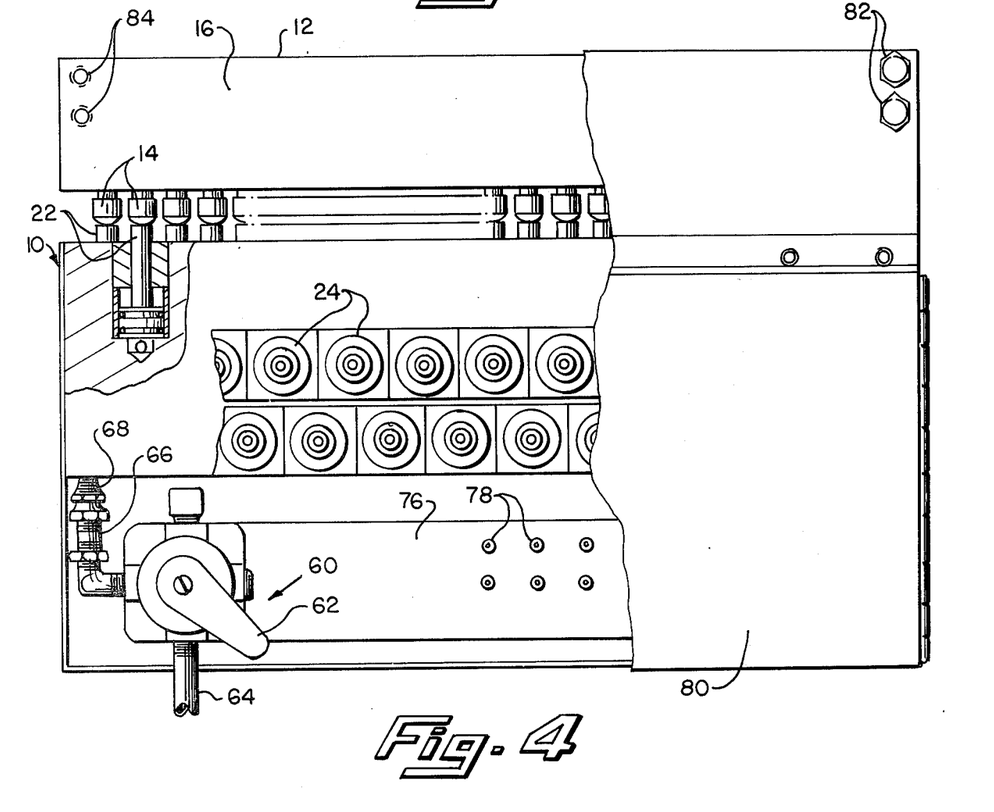
FIG. 4 is a partially broken-away front view of the valve block assembly and glass forming machine of FIG. 1.

As illustrated in FIGS. 2 and 4, valves 14 are positioned in two staggered rows and depend from a body portion 16 of the glass forming machine. Because the glass forming machine is conventional and well known in the art, a detailed description thereof will not be given. It will suffice merely to state that the steps required in forming the glassware are sequentially initiated by appropriately timed sequential actuation of the mechanical valves 14. For a more detailed description of the type contemplated for use with the present invention, reference is made to U.S. Pat. No. 1,911,119, issued May 23, 1933.

Figure 5:
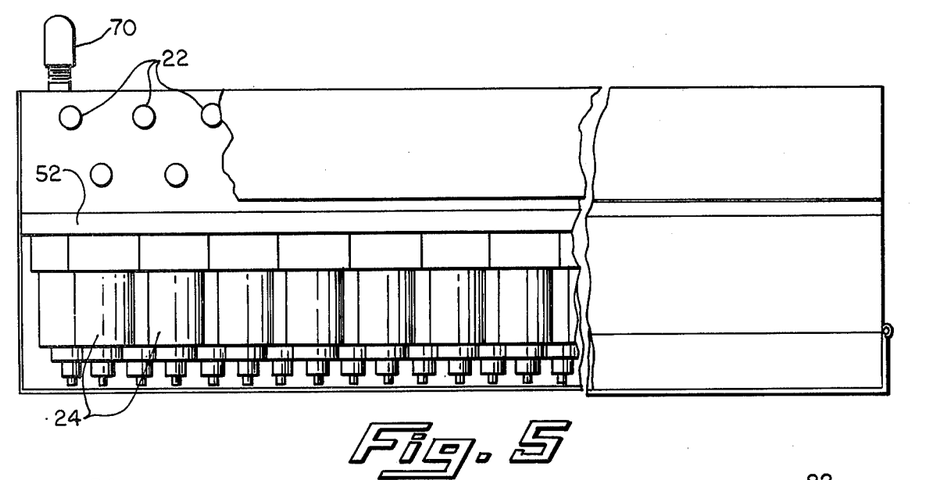
FIG. 5 is a partially broken-away top view of the valve block assembly of FIG. 1.

As will be described in more detail hereinafter, valve block assembly 10 includes a plurality of piston and cylinder arrangements 18 (FIGS. 2 and 3), the pistons of which are pneumatically driven from a retracted position to an extended position by a pressurized air supply 20 which, for reasons to be set forth hereinafter, is preferably independent of the glass forming machine 12. Upon removing the air supply, the pistons return to their retracted positions, as will be seen hereinafter. As illustrated best in FIGS. 1 and 5, the pistons which comprise part of piston and cylinder arrangement 18 and which are generally designated by the reference numeral 22, extend upwardly and are positioned in two staggered rows (FIG. 5) directly under and in alignment with mechanically actuated valves 14. In this manner, when the pistons are driven from their retracted positions to their extended positions, they mechanically actuate associated aligned valves 14 for initiating into operation corresponding operational steps of glass forming machine 12.

Valve block assembly 10 also includes a plurality of electromagnetic solenoid valve arrangements 24, one for each of the piston and cylinder arrangements 18. These valve arrangements are connected to air supply 20 and, in response to an electrical signal, apply air pressure to their associated pistons 22 for driving the latter from a retracted position to an extended position. Accordingly, by energizing valve arrangements 24 in a predetermined order and at predetermined time intervals, the valves 14 of glass forming machine 12 can be mechanically actuated in the same predetermined order and at the same time intervals for initiating into operation the steps required by glass forming machine 12 in its production of glassware.

A signal producing device 26 is provided for producing a plurality of electrical pulses at the aforestated predetermined time intervals, these pulses being provided for energizing the solenoid valve arrangements in the predetermined sequence and at the predetermined time intervals. Because the signal producing device per se forms no part of the present invention other than in combination with valve block assembly 10, a detailed description thereof will not be given. It is deemed sufficient merely to state that the device must be capable of producing at its output a plurality of appropriately timed pulsed signals or other suitable signals capable of energizing solenoid valve arrangements 24 in appropriate sequence and at the appropriate predetermined time intervals. One such device is disclosed in the aforestated U.S. Pat. No. 3,365,623, issued to D. S. Stacy on Jan. 23, 1968. Another device is disclosed in the aforestated U.S. Pat. No. 3,762,907.

Figure 3:
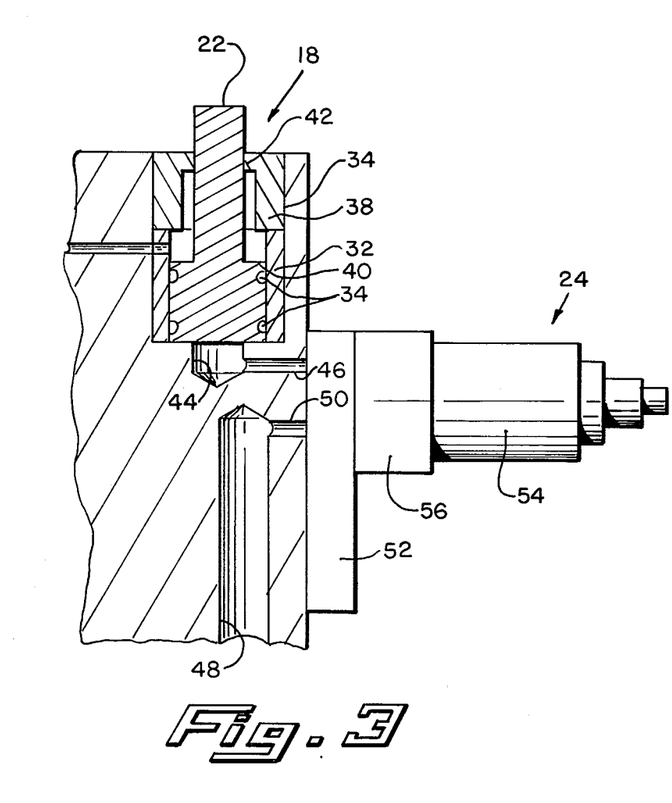
FIG. 3 is an enlarged partially sectional view of a part of the valve block assembly of FIG. 1.

Turning now to FIGS. 2, 3 and 4 in conjunction with FIG. 1, attention is directed to the details of valve block assembly 10 which, as illustrated, includes a horizontally extending, elongated and rectangular support block 30 which is provided for supporting piston and cylinder arrangements 18 and solenoid valve arrangements 24, as well as for pneumatically connecting individual valve arrangements to individual piston and cylinder arrangements. In this regard, as will be seen hereinafter, the support block is provided with a plurality of openings, each of which is adapted to receive a piston and cylinder arrangement and air passages connecting the latter to associated valve arrangements, as well as for connecting the valve arrangements to air supply 20.

Turning specifically to FIG. 3, one of the piston and cylinder arrangements 18 is shown in detail. As illustrated, this arrangement includes a cylinder 32 positioned tightly within and around the lower end of a cylindrical opening or bore 34 extending downwardly into support block 30 from the top thereof. Cylinder 32 is designed to slidably receive the head of piston 22, as illustrated in FIG. 3, so that the latter extends upwardly and out of the support block 30, a pair of O-ring seals 36 being provided around the head of piston 22 for preventing air from passing between the adjacent walls of the piston head and cylinder. A closure ring 38 which is slightly larger in diameter than cylinder 32, is also tightly positioned within and around opening 34 and directly on top of the cylinder. Due to its thickness, closure ring 38 defines an annular shoulder 40 which limits the upward movement of cylinder 22. In addition, the closure ring includes an upper radially inwardly extending shoulder 42, which slidably engages the top portion of piston 22 for providing guidance thereto.

Operationally, upon applying air pressure to the bottom of piston 22, the latter is driven to its extended position for mechanically actuating a vertically aligned glass forming machine valve 14. In this regard, opening 34 is counter bored at its bottom or otherwise provided with an opening 44, which, in turn, communicates with an air passage 46 extending from opening 44 to one side of block 30, where, as will be seen hereinafter, the latter cooperates with an associated solenoid valve arrangement 24 for providing air pressure to the bottom of piston 22.

As illustrated in FIG. 3, support block 30 also includes an air passage 48, which extends upwardly from the bottom of the block and which, as will be seen hereinafter, is adapted to receive air under pressure from source 20. A further air passage 50, extending from passage 48 to the side of block 30, is provided for passing the air from passage 48 to an external manifold or air distribution assembly 52, which is mounted to the side of block 30 and which equally distributes the air from passages 48 and 50 to the various valve arrangements 24, and thereafter to associated passages 46 when the valve arrangements are energized.

As illustrated in FIG. 3, each of the valve arrangements 24 includes an internal manifold or air chamber 54 which is adapted to receive air under pressure from external manifold assembly 52, and an electromagnetic switching member 56, which, upon energization of the valve assembly moves from a closed position to an open position for allowing the air from manifold 54 to pass through a cooperating passageway (not shown) in assembly 52 and into associated passageway 46 for pneumatically driving a corresponding piston from its retracted position to its extended position. Because the valve arrangements 24 are conventional and form no part of the present invention other than in combination with the remaining components making up the valve block, they will not be described in detail. However, one example of such a switching arrangement is a 200-series manifold-mounted "MAC" valve.

Returning to FIG. 1, an air flow connector arrangement 60 is connected between air supply 20 and passageway 48 for directing air under pressure from the air supply to the passageway. This arrangement includes a shut-off valve 62 connected at its input to air supply 20 by a suitable air flow conduit 64 and at its output to passageway 48 by a suitable conduit or air flow tube 66, the latter of which includes an appropriate fitting 68 adapted to engage around and to the passageway. Accordingly, the entire air flow system can be shut off during inoperation of the block assembly. In this regard, a shut-off valve release 70 (FIG. 2) is provided with valve 62 for allowing pressure buildup in valve block assembly 10 to dissipate through a filter 72 when the shut-off valve is in its closed position.

As illustrated best in FIG. 1, support block 30 is positioned within an elongated rectangular housing 74, which is open at the top thereof, and is suitably mounted to the top inner wall thereof. In this manner, the pistons 22, of piston and cylinder arrangements 18, extend upwardly and out of the support block 30 for engagement with corresponding mechancially actuated valves 14. Further, the external manifold or air distribution assembly 52, which is suitably mounted to the exposed face of support block 30, supports the valve arrangements 24 in two staggered rows, as illustrated in FIGS. 1 and 4. As can be seen in FIG. 2, the lower row of valve arrangements are provided for controlling the back row of piston and cylinder arrangements. The counter bores or openings 44, associated with the back row of piston and cylinder arrangements extend downwardly a greater distance than those counter bores associated with the front row thereof. In this manner, the connections between these passageways and associated valve arrangements are made easier.

Shut-off valve 62 is also positioned within housing 74, along with a terminal board 76 suitably mounted to the lower inside wall thereof, the terminal board including a plurality of terminals 78 which are provided for connecting the aforedescribed pulsed signals from device 26 to the various electromagnetic valve arrangements 24. A hinge-mounted access door 80 is provided on the front of housing 74 for substantially enclosing valve block assembly 10 so as to prevent dust and other environmental particles from adversely affecting its operation.

Housing 74 includes two pairs of spaced-apart aligning bolts 82 (only one pair being shown) which are adapted to engage within cooperating threaded apertures 84 provided in the glass forming machine for supporting the housing to the latter. The bolts 82 and apertures 84 are appropriately positioned for aligning pistons 22 directly under associated mechanically actuated valves 14 and a predetermined distance therefrom.

With valve block assembly 10 constructed in the aforedescribed manner, attention is now directed to its operation. Specifically, upon opening shut-off valve 62, air under pressure is supplied from source 20 and passed through passageways 48 and 50 into external manifold 52, where the air is equally distributed under pressure to the various manifolds 54 making up valve arrangements 24. In this manner, each of the internal manifolds acts as a separate pressurized air supply for an associated piston and cylinder arrangement. Upon energizing a particular valve arrangement, the latter moves from a closed position to an opened position for allowing the air under pressure to pass from manifold 54 through manifold 52, and into passageway 46 where the air pressure is directed to the bottom of an associated piston 22 for moving the latter to its extended position so as to actuate an aligned valve 14 and, therefore, initiate into operation a corresponding glass forming step. When the valve arrangement is de-energized, the passageway between manifold 54 and manifold 52 is closed and the air pressure within the piston and cylinder arrangement is allowed to dissipate. In this regard, a filtered release valve 90 is mounted through the support block 30 and cylinder 32 for allowing the air between the piston and cylinder to dissipate therethrough.

As stated above, when valve arrangement 24 is de-energized, pressurized air from manifold 54 is prevented from reaching piston 22. If, as is generally the case, mechanically actuated valves 14 are biased in their downwardly extending position, they will force their aligned pistons downwardly. However, if there is no external biasing force applied to the pistons, a spring element (not shown) would be provided for biasing the pistons in their retracted positions. In addition, the valve arrangements are preferably slightly opened when in a de-energized, or closed, position so that a slight back pressure is build up under the pistons for biasing the latter slightly upwardly and in constant engagement with their associated mechanically actuated valves. In this manner, when driven to their extended positions, the pistons will not slam against valves 14 which could otherwise cause excessive noise and possible damage to both components.

It should be readily apparent that by utilizing valve block assembly 10 in the aforedescribed manner for mechanically actuating glass forming machine valves 14 in an electronically controlled timed sequence, the advantages of mechanical actuation and electronic control are attained. In addition, by utilizing the valve block assembly rather than directly actuating valves 14 electronically, an independent air supply having a reasonably pure air supply for driving the valve block assembly can be more economically provided with the assembly than would otherwise be economically possible if a single larger air supply were used for both the valve block assembly and glass forming machine. Further, since lubricants for the glass forming machine are generally provided through the air supply, this means that a higher quality lubricant can be more economically provided for the valve block assembly independent of the larger quantity and lower quality lubricant used with the glass forming machine. This, in turn, would minimize malfunctions of the valve block assembly otherwise caused by impure air and/or low quality lubricants.

Although one embodiment of the present invention has been illustrated and described, it is anticipated that various changes and modifications will be apparent to those skilled in the art and that such changes may be made without departing from the scope of the invention as defined by the following claims.

What is claimed is:

1. In a glass forming machine which performs, in sequence, a plurality of steps to produce glass articles, an improved means for controlling the operational sequence of a plurality of movable components in said machine by controlling the pressure of an operational fluid at each of a plurality of component actuating means, said controlling means comprising:
    a source of pressurized gas,
    a valve block having a plurality of cavities therein,
    a piston positioned in each cavity, each piston being selectively movable with respect to its associated cavity to an extended position,
    a plurality of solenoid operated valve means, said valve means each controllably coupling said pressurized air to one of said cavities to thereby move said piston in said cavity to said extended position,
    means for generating electrical signals for energizing said solenoid operated valve means at predetermined intervals to thereby control the movement of said pistons in said cavities in a preselected manner, and
    a plurality of mechanically operated pneumatic valves, each of said valves controlling the flow of fluid under pressure to thereby control said glass forming machine, each pneumatic valve having an operating rod extending therefrom which controls the operation of its associated valve when moved, said operating rods being aligned and engaged with a corresponding one of said pistons, each operating rod being moved by the movement of a corresponding piston to its extended position to thereby initiate a step in the operation of said glass forming machine.

2. In a glass forming machine which performs, in sequence, a plurality of steps to produce glass articles, an improved means for controlling the operational sequence of a plurality of movable components in said machine by controlling the pressure of an operational fluid at each of a plurality of component actuating means, said controlling means comprising:
    a source of pressurized air, a valve block having a plurality of cavities therein, a piston positioned in each cavity, each piston being selectively movable with respect to said cavity to an extended position, each of said pistons being biased to a normally retracted position,
    channel means in said valve block for coupling said pressurized air from said source to each of said cavities,
    a gating means for selectively controlling the flow of said pressurized air to each of said cavities, said gating means comprising a plurality of solenoid operated valve means, one for each cavity, said valve means each being responsive to an electrical signal for controllably coupling said pressurized air to a corresponding one of said cavities to thereby move said piston in said cavity to an extended position,
    means for generating electrical signals at predetermined intervals and for coupling said signals to preselected ones of said solenoid operated valve means to thereby control said valve means, and
    a plurality of mechanically operated pneumatic valves, each of said valves controlling the flow of a fluid under pressure to thereby control said glass forming machine, each pneumatic valve having an operating rod extending therefrom which controls the operation of its associated valve when actuated, said operating rods being aligned and engaged with a corresponding one of said pistons, each operating rod being moved by the movement of a corresponding piston to its extended position to thereby initiate a step in the operation of said glass forming machine.

3. An improved multisection glassware forming machine, each section including a plurality of mechanical means for performing in sequence a plurality of steps to produce glass articles, said mechanical means including means for delivering gobs of molten glass to a blank station in the machine section at a rate which can be varied, a blank mold operable to and from an active position at the blank station, a split neck mold operable between open and closed positions whereby said split neck mold is adapted to cooperate with said blank mold to define a parison cavity, a plunger operable to and from an active position at the blank station, means for settling the gob into the split neck mold, secondary parison mold defining means operable to and from an active position at said blank station, and cooperating with said blank mold to define said parison cavity, transfer means for moving said split neck mold and the parison formed in said cavity out of said blank station and into a blow station, a split blow mold operable between said opened and closed positions at said blow station, means for final forming the parison at the blow station, and takeout means for moving the final blow article from said blow station; a plurality of pneumatic actuators, one for controlling the operation of each of said mechanical means, wherein the improvement comprises:

a source of pressurized gas, means for normally biasing said piston to a first non-extended stable position, a plurality of solenoid operated valve means, said valve means each controllably coupling said pressurized air to a corresponding one of said cavities to thereby move said piston within said cavity from said stable position to said extended position, means for generating electrical signals for energizing said solenoid operated valve means at predetermined intervals, said electrical signals being coupled to preselected ones of said solenoid operated valve means to thereby control the operational sequence of said mechanical means, and a plurality of mechanically operated pneumatic valves, each of said valves controlling the flow of a fluid under pressure to said pneumatic actuators to thereby control said glass forming machine, each pneumatic valve having an operating rod extending therefrom which controls the operation of its associated valve when moved, said operating rods being aligned and engaged with a corresponding one of said pistons, each operating rod being moved by the movement of a corresponding piston to its extended position to thereby initiate a step in the operation of said glass forming machine.

4. An improved multisection glassware forming machine, each section including a plurality of mechanical means for performing in sequence a plurality of steps to produce glass articles, said mechanical means including means for delivering gobs of molten glass to a blank station in the machine section at a rate which can be varied, a blank mold operable to and from an active position at the blank station, a split neck mold operable between open and closed positions whereby said neck mold is adapted to cooperate with said blank mold to define a parison cavity, a plunger operable to and from an active position at the blank station, means for settling the gob into the neck mold, secondary parison mold defining means operable to and from an active position at said blank station, and cooperating with said blank mold to define said parison cavity, transfer means for moving said split neck mold and the parison formed in said cavity out of said blank station and into a blow station, a split blow mold operable between said open and closed positions at said blow station, means for final forming the parison at the blow station, and takeout means for removing the final blown article from said blow station; a plurality of pneumatic actuators, one for controlling the operation of each of said mechanical means, wherein the improvement comprises:

a source of pressurized gas, a valve block having a plurality of cavities therein, a piston positioned in each cavity, each piston being selectively movable with respect to said cavity to an extended position, means for normally biasing said piston to a first non-extended stable position, a plurality of solenoid operated valve means, said valve means each controllably coupling said pressurized air to a corresponding one of said cavities to thereby move said piston within said cavity from said stable position to said extended position, means for generating electrical signals for energizing said solenoid operated valve means at predetermined intervals, said electrical signals being coupled to preselected ones of said solenoid operated valve means to thereby control the operational sequence of said mechanical means, and a plurality of mechanically operated pneumatic valves, each of said valves controlling the flow of fluid under pressure to each of said pneumatic actuators, each pneumatic valve having an operating rod extending therefrom which controls the operation of its associated valve when moved, said operating rods being aligned and engaged with a corresponding one of said pistons, each operating rod being moved by the movement of a corresponding piston to its extended position to thereby initiate a step in the operation of said glass forming machine.

5. The improvement of claim 4 further comprising a safety valve connected between said source of pressurized air and said plurality of solenoid operated valve means, said safety valve being controllable to prevent the coupling of said pressurized air to said solenoid operated valve means, and pressure bleed off means for releasing the pressurized air from said solenoid operated valve means when said safety valve prevents the passage of said pressurized air to said solenoid valve means.

* * * * *